United States Patent
Fabian et al.

(10) Patent No.: US 12,353,028 B2
(45) Date of Patent: Jul. 8, 2025

(54) FIBER OPTIC BACKPLANE CONNECTOR WITH SPACER

(71) Applicant: TE Connectivity Solutions GmbH, Schaffhausen (CH)

(72) Inventors: David James Fabian, Mt. Joy, PA (US); James Patrick Mosier, Palmyra, PA (US); Christopher Gross, Lititz, PA (US)

(73) Assignee: TE Connectivity Solutions GmbH (CH)

( * ) Notice: Subject to any disclaimer, the term of this patent is extended or adjusted under 35 U.S.C. 154(b) by 246 days.

(21) Appl. No.: 18/107,305

(22) Filed: Feb. 8, 2023

(65) Prior Publication Data

US 2024/0264386 A1 Aug. 8, 2024

(51) Int. Cl.
 *G02B 6/00* (2006.01)
 *G02B 6/38* (2006.01)
 *G02B 6/44* (2006.01)

(52) U.S. Cl.
 CPC ......... *G02B 6/3897* (2013.01); *G02B 6/3825* (2013.01); *G02B 6/4452* (2013.01)

(58) Field of Classification Search
 CPC .. G02B 6/3897; G02B 6/3825; G02B 6/4452; G02B 6/3882; G02B 6/3885; G02B 6/00
 See application file for complete search history.

(56) References Cited

U.S. PATENT DOCUMENTS

| | | | |
|---|---|---|---|
| 8,701,265 B1 * | 4/2014 | James | B64C 1/20 24/297 |
| 2014/0044395 A1 * | 2/2014 | Waldron | G02B 6/38 385/60 |
| 2018/0164513 A1 | 6/2018 | Fabian et al. | |
| 2021/0356679 A1 * | 11/2021 | Dannoux | G02B 6/3869 |

FOREIGN PATENT DOCUMENTS

| | | |
|---|---|---|
| EP | 2637049 A2 | 11/2013 |
| EP | 3514894 A1 | 7/2019 |

OTHER PUBLICATIONS

European Search Report, European U.S. Appl. No. 24/156,242 International Filing Date Jun. 26, 2024.
Paul J.: "VITA 66.X 2D Drawings", Amphenol Corporation, Oct. 19, 2025, XP093172747.

* cited by examiner

*Primary Examiner* — Jennifer Doan (57) ABSTRACT

A backplane connector kit configured for mounting on a backplane and comprising: (a) an insert; (b) a retainer defining a retainer length, and being configured to receive at least one ferrule of a cable assembly and to couple with the insert, thereby securing the cable assembly to the insert; (c) an outer shell; and (d) at least one spacer configured to allow a first end of the spacer to seat with a front side of the backplane, and a second end of the spacer to seat with the outer shell; wherein the length of the spacer is sufficiently long such that the spacer receives at least a portion of retainer such that no more than 50% of the retainer length extends beyond the back side of the backplane.

18 Claims, 8 Drawing Sheets

FIBER OPTIC BACKPLANE CONNECTOR WITH SPACER

FIELD OF INVENTION

The subject matter herein relates, generally, to optical connectors, and, more specifically, to a fiber optic backplane connector that provides additional space for routing the optical fiber between the backplane and the system chassis enclosure.

BACKGROUND

Figure 5:
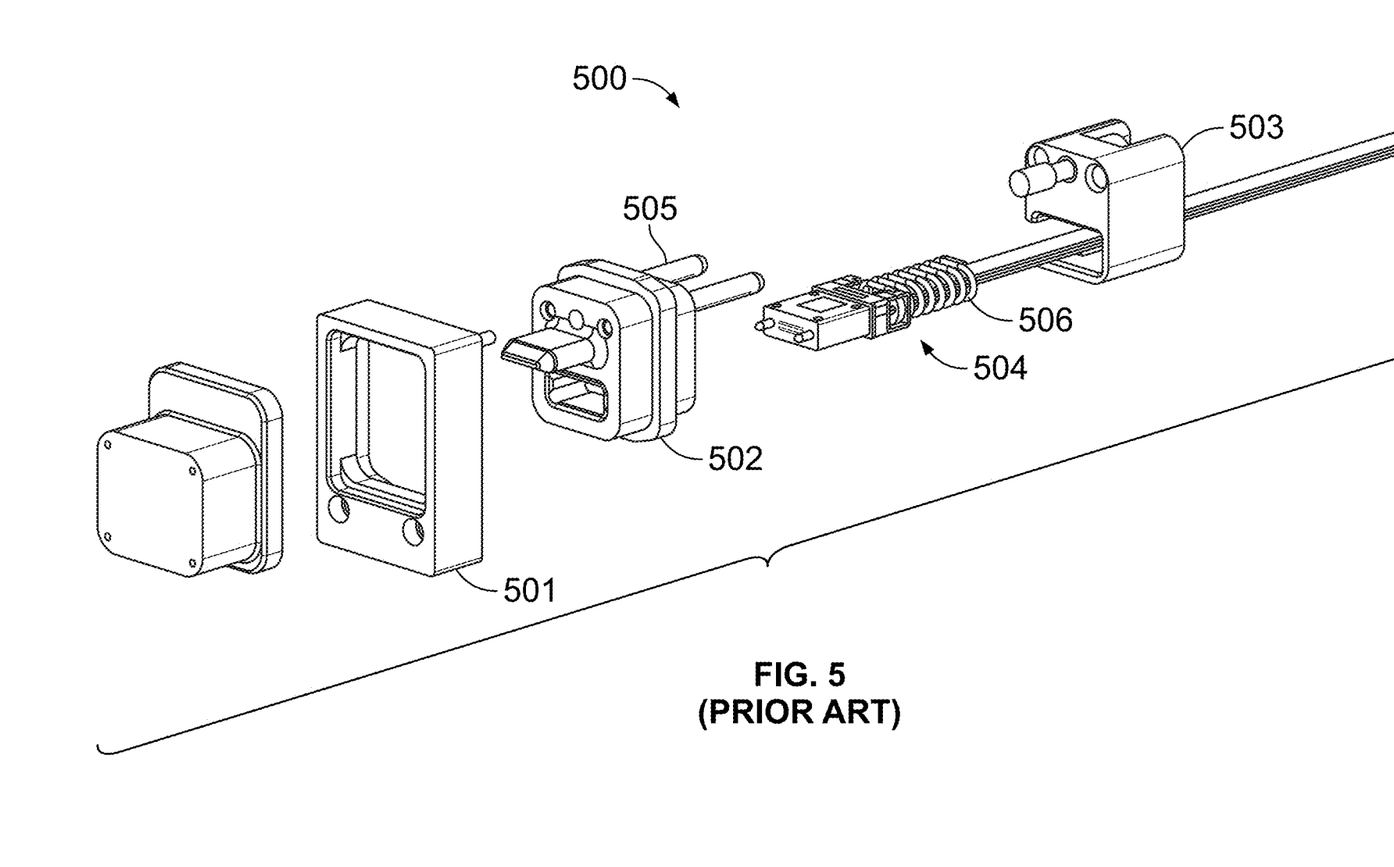
FIG. 5 shows an exploded view of a prior art backplane connector.

A backplane connector kits are well known, and include for example, the VITA 66.5 connector kit. This backplane connector kit accommodates an MT fiber optic cable assembly that passes through the backplane to connect to the MT interface of a fiber optic transceiver located on the plug-in module card, or to a mating MT cable assembly. Referring to FIG. 5, a prior art backplane connector kit 500 is shown. The backplane connector kit 500 includes a fixed outer shell 501, a floating insert 502, a retainer 503, and other components. The insert is captured between the outer shell and the backplane aperture, such that it can float laterally between them. The retainer secures the MT cable assembly 504 within the floating insert, and is aligned with the insert using alignment pins 505. The installed cable assembly contains the MT ferrule, and it may contain a spring 506 that provides the mechanical force supporting the MT-to-MT mating interface.

Typically, backplane-based systems (such as VPX or OpenVPX systems) with plug-in modules are contained within the system chassis/enclosure. The space between the backplane and the chassis enclosure can be limited.

Applicant recognizes that in certain applications space is required behind the connector to accommodate a possible right-angle (90°) turn of the installed fiber optic cable. Specifically, Applicant recognizes that a fiber optic cable assembly may require a right-angle turn behind the backplane, for routing to another card slot location on the backplane, or to the system I/O interface through the enclosure. However, depending on the system configuration, the space between the backplane and the interior of the enclosure may be limited. By way of background, the existing, standard connector configuration is designed to minimize the space the mating connector and transceiver extend onto the plug-in module pc board. Consequently, considerable space is required behind the backplane to accommodate both the protruding backplane connector and the minimum bend radius of the optical fiber to assure reliability.

Applicant recognizes that, while a new connector could be developed to require less space behind the backplane, it may not be practical or cost-effective to have separate designs for applications having different space constraints.

Applicant also recognizes that the conventional backplane connector needs to be assembled in situ, which can be inefficient. Specifically, the shop-handling to install a standard connector requires several steps. First, the user orients the floating insert within the outer shell, then positions them in the respective aperture on the mounting side of the backplane pc board. Then, the mounting screws are secured from the rear side of the board. This requires handling the outer shell and the floating insert as separate pieces on one side of the board while installing the screws from the other side. Next, the user populates the MT cable assembly into the insert, then installs the retainer, securing it in place with the captive screw.

Therefore, Applicant has identified the need for a backplane connector having adjustable clearance at the rear of the backplane, and for a backplane connector that reduces in situ assembly. The present invention fulfills these needs among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicant has developed a backplane connector kit that includes a spacer component to shift the MT mating interface forward relative to the backplane. This provides additional space for routing the optical fiber behind the backplane—i.e., between the backplane and the system chassis enclosure. In one embodiment, this spacer t enables the use of standard backplane connector components.

One of the advantages of the present invention is that it creates a new low-profile configuration, measured relative to the backplane mounting surface. Also, in one embodiment, it re-uses the existing outer shell, floating insert, and retainer components of the standard connector, along with the new, added spacer component to achieve this effect. Thus, special variations of the standard components are not required. Additionally, the spacer thickness can be selected based on the clearance available within a given system application. The spacer thickness may be optimized accordingly, depending on the space available between the backplane and the enclosure. In other words, spacers of different thicknesses may be used, while the other components remain common. This provides flexibility to support applications having different space constraints.

Another advantage the new spacer component provides is that enables pre-building a subassembly at the factory. The subassembly consists of the outer shell, the floating insert, and the spacer. Then, the user simply installs this unitized subassembly to the backplane. This facilitates the shop-handling for the user, plus it may reduce risk of installation errors.

In one embodiment, a backplane connector kit configured for mounting on a backplane having a front and back side, and defining an orifice, said front side defining a first footprint around the orifice, the first footprint having a first geometry, the backplane connector kit comprising: (a) an insert; (b) a retainer defining a retainer length, and being configured to receive at least one ferrule of a cable assembly and to couple with the insert, thereby securing the cable assembly to the insert; (c) an outer shell having a second footprint with a second geometry configured to seat with a footprint having the first geometry, and being configured to receive and allow the insert to float laterally within the outer shell; and (d) at least one spacer comprising at least; (i) a hollow body having first and second end faces, and defining a cavity and a length between the first and second end faces; (ii) wherein the first and second end faces define third and fourth footprints, respectively, the third and fourth footprints having second and first geometries, respectively, thus the third footprint seats with a footprint having the first geometry, and the fourth footprint seats with a footprint having the second geometry, thereby allowing first end of the spacer to seat with the front side of the backplane, and the second end of the spacer to seat with the outer shell; (iii) wherein the cavity is sufficiently wide to allow the insert when coupled to the retainer to move laterally within the cavity; and (iv) wherein the length is sufficiently long such that the spacer receives at least a portion of the insert and at least a sufficient portion of the retainer such that no more than 50% of the retainer length extends beyond the back side of the backplane.

DETAILED DESCRIPTION

Figure 1:
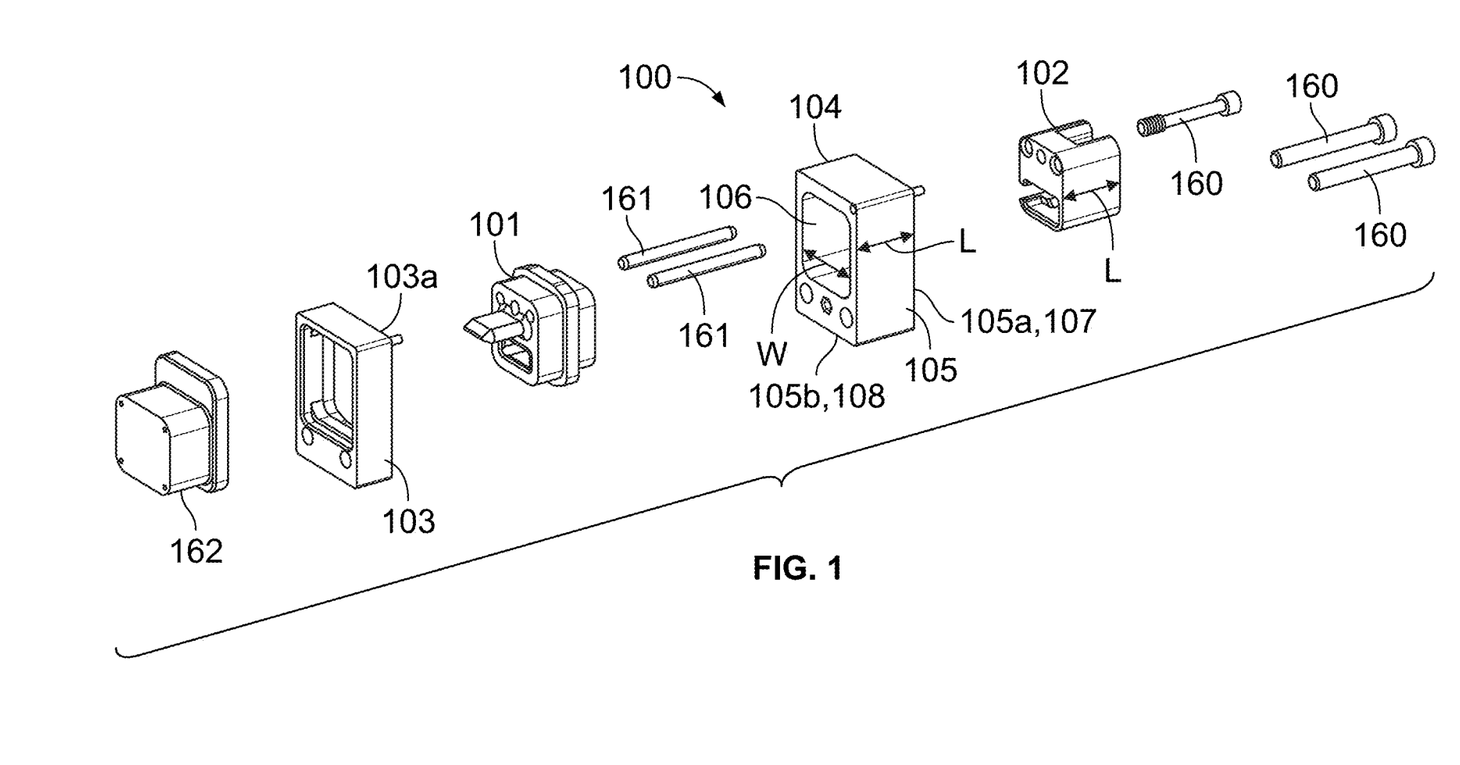
FIG. 1 shows an exploded view of one embodiment of the backplane connector kit of the present invention.
Figure 2:
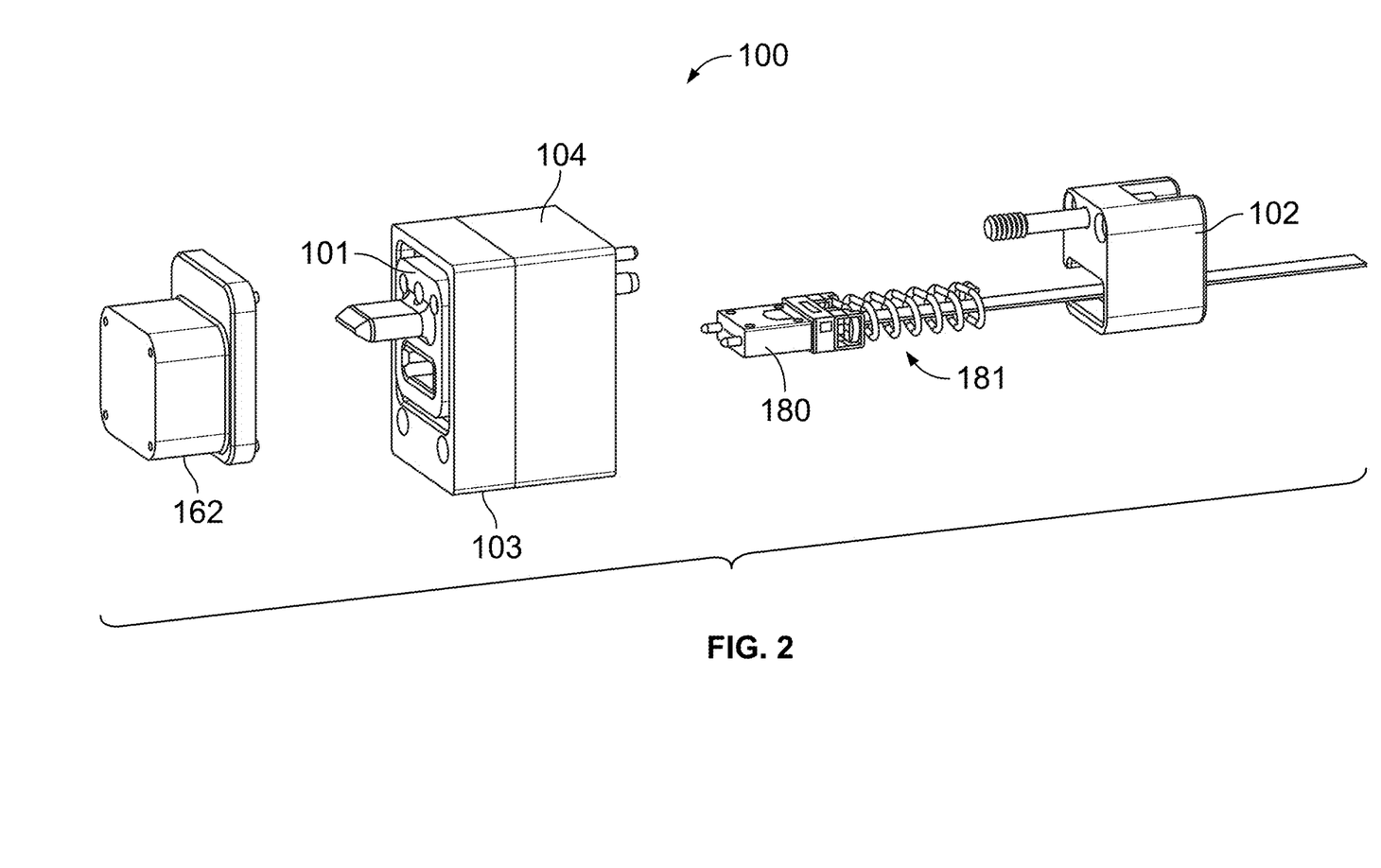
FIG. 2 shows an exploded view of the backplane connector kit of FIG. 1, partially assembled.
Figure 3:
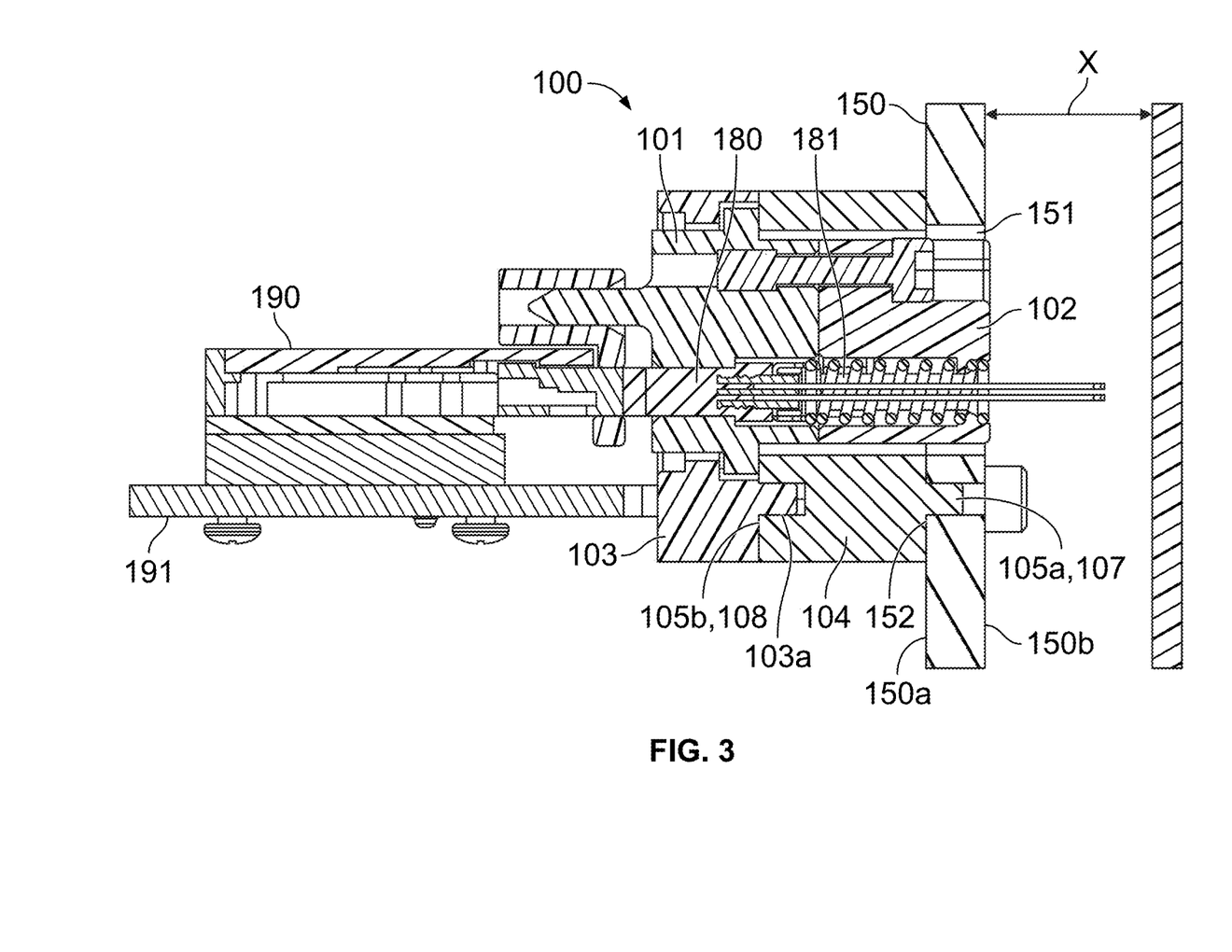
FIG. 3 shows a cross-section of the back plane connector kit of FIG. 1 assembled and connected to the backplane.

Referring to FIGS. 1-3, one embodiment of a backplane connector kit 100 of the present invention is shown. The kit 100 is configured for mounting on a backplane 150 having a front and back side 150a, 150b, and defining an orifice 151. The front side defines a first footprint 152 around the orifice, the first footprint having a first geometry.

The backplane connector kit comprising: (a) an insert 101; (b) a retainer 102 defining a retainer length (RL), and being configured to receive at least one ferrule 180 of a cable assembly 181 and to couple with the insert, thereby securing the cable assembly to the insert; (c) an outer shell 103 having a second footprint 103a with a second geometry configured to seat with a footprint having the first geometry, and being configured to receive and allow the insert to float laterally within the outer shell; and (d) a spacer 104.

The spacer 104 comprises at least (i) a hollow body 105 having first and second end faces 105a, 105b, and defining a cavity 106 and a length (L) between the first and second end faces; (ii) wherein the first and second end faces define third and fourth footprints 107, 108 respectively, the third and fourth footprints having second and first geometries, respectively, thus the third footprint with a footprint having the first geometry, and the fourth footprint seats with a footprint having the second geometry, thereby allowing fourth footprint of the spacer to seat with the first footprint of the backplane, and the third footprint of the spacer to seat with the second footprint of the insert; (iii) wherein the cavity has a width (W) sufficient to allow the insert when coupled to the retainer to move laterally within the cavity; and (iv) wherein the length L is sufficiently long such that the spacer receives at least a portion of the insert and at least a sufficient portion of the retainer such that no more than 50% of the retainer length RL extends beyond the back side of the backplane.

Each of these features is described in greater detail below along with selected alternative embodiments.

FIGS. 1-3 also disclose various fasteners 160, alignment pins 161, and a dust cap 162, which are known in the art. FIG. 3 also shows the assembled backplane connector connected to both the backplane 150, and a transceiver 190 which is mounted on a plug-in module PC board 191.

An important feature of one embodiment of the present invention is the spacer. The spacer functions to increase the distance between the rear of the retainer and the system enclosure. To this end, the spacer moves the retainer forward relative to the backplane. The degree to which the spacer moves the retainer forward relative to the backplane can vary, and will generally depend on the space available between the backplane and the system enclosure. In other words, in systems with relatively little space between the backplane and the system enclosure, the spacer may need to be longer to position the retainer further forward relative to the backplane—i.e. further from the system enclosure. In one embodiment, the length L of the spacer is sufficiently long such that the spacer receives at least a sufficient portion of the retainer such that no more than 50%, or no more than 25%, or no portion, of the retainer length RL extends beyond the back side of the backplane. In one embodiment, one the spacer receives the retainer in its entirety. In one embodiment, the spacer receives the entire retainer such that it is forward of the front side of the backplane.

Figure 4:
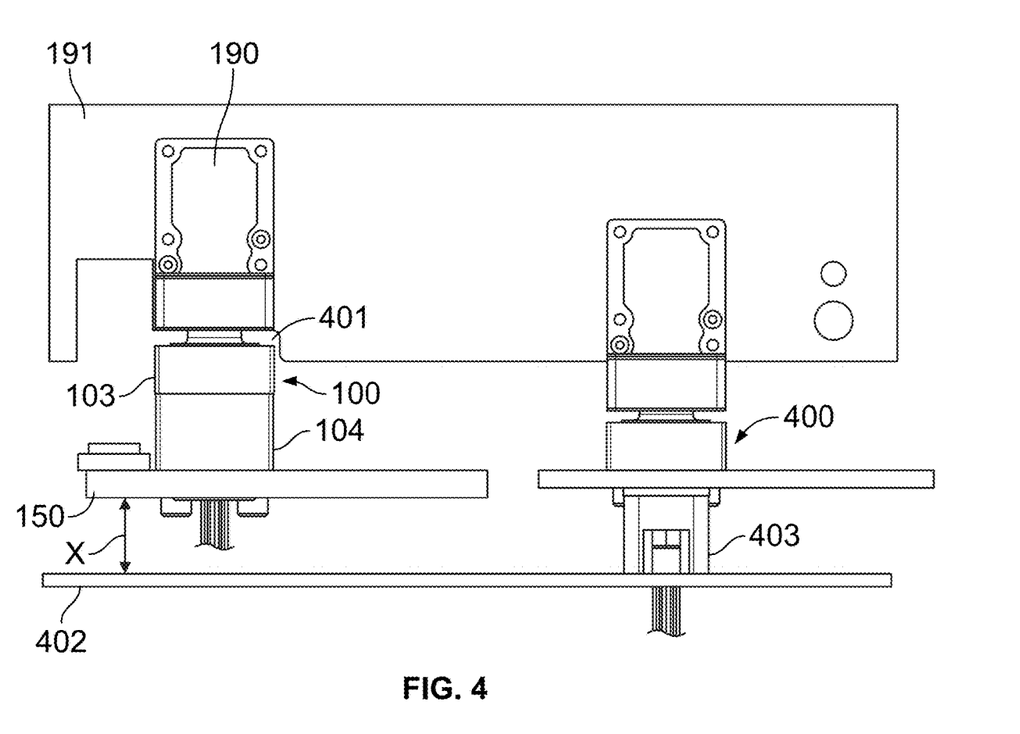
FIG. 4 shows a side-by-side comparison of the assembled backplane connector of FIG. 1 alongside a prior art backplane connector.

Referring to FIG. 4, a side-by-side comparison of the backplane connector 100 of the present invention is compared to a prior art backplane connector 400. As shown, the backplane 150 is in a system enclosure 402 such that the distance X behind the backplane 150 and the system enclosure is limited. This may not be a problem for a prior art configuration in which the cable assembly exits through system enclosure as shown in the prior art backplane connector configuration. However, if the cable assembly cannot exit through the system enclosure, then the cable assembly must be bent to run along the inside of the system enclosure. As is known, fibers have a minimum bend radius which precludes sharp bends.

Nevertheless, because the backplane connector 100 comprises a spacer 104 to accommodate the retainer and move it forward relative to the backplane, space X is now available to allow for a proper bend of the cable assembly. On the other hand, referring to the prior art backplane connector 400, the retainer 403 extends backward from the backplane connector such that there is little or no room for bending the fiber.

It should be noted that in this embodiment of FIGS. 1-3, a portion 401 of the plug-in module card 191 is removed to accommodate the extended length of the backplane connector of the present invention forward of the backplane.

Figure 8:
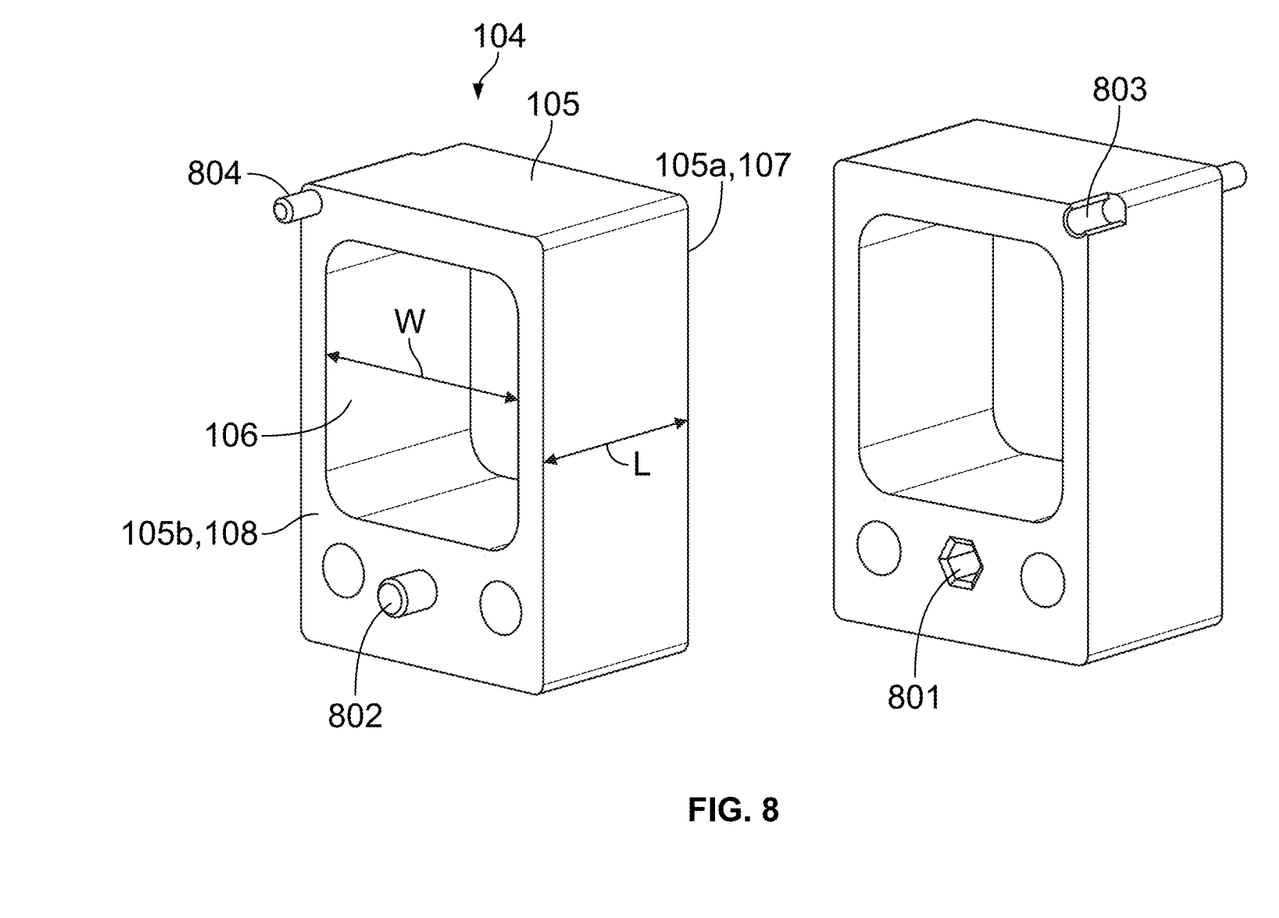
FIG. 8 shows a perspective view of a "stackable" spacer embodiment of the present invention.

In one embodiment, the spacer 104 may comprise one or more stackable components as shown in FIG. 8. In this embodiment, the spacers 104 are configured to snap together so as to customize the size of the spacer. To this end, the spacer 104 comprises a press fit cavity 801 on one end face, and a post 802 on the other face. In one embodiment, the spacer one of four also comprises an alignment slot 803 on one end face, and an alignment pin 804 on the other end face. The press fit cavity is configured to receive the post, and the alignment slot is configured to receive the alignment pin. Accordingly, the two spacers can be coupled and aligned by inserting the post in the press fit cavity, and the alignment pin in the alignment slot. Although two spacers are shown in FIG. 8, it should be understood that any number of spaces may be snap together to provide a configurable spacer length.

In one embodiment, the spacer facilitates the use of standard backplane connector components. The connector kit of the present invention facilitates the use of standard components by configuring the spacer to mimic the seat geometry of the outer shell on one end face, and the seat geometry of the backplane on the other. This allows it to be inserted between the two to provide space for the retainer forward of the backplane. In one embodiment, at least one of the retainer, insert or outer shell is a standard component. In one embodiment, at least two of the components are standard. In the embodiment of FIGS. 1-3, all of three of the components are standard. Allowing the spacer to be used with one or more standard connector components is beneficial as it reduces inventory requirements, minimizes the need to reengineer components, and facilitates early adoption of the spacer.

As used herein, a "standard" backplane component is one that conforms with a known backplane standard. Such standards are well known and usually define the geometry of the footprint on the backplane. For example, such standards include ANSI/VITA 67.3-2022, Connector Module Type A Backplane Aperture (Per ANSI/VITA 67.1-2019, FIG. 3.3.2-1); ANSI/VITA 67.3-2022, Connector Module Type B Backplane Aperture (Per ANSI/VITA 67.2-2020, FIG. 3.3.2-1); ANSI/VITA 67.3-2022, Connector Module Type C Backplane Aperture (per 6.1.3.2-1); ANSI/VITA 67.3-2022, Connector Module Type D Backplane Aperture (per 6.1.3.2-1); ANSI/VITA 67.3-2022, Connector Module Type E Backplane Aperture; (per FIG. 6.1.3.2); ANSI/VITA 67.3-2022, Connector Module Type F Backplane Aperture (per FIG. 6.1.6.2-1); (ANSI/VITA 66.0-2016, FIG. 3.2.1-1); ANSI/VITA 66.0-2016, FIG. 3.2.1-1: Full-Width Fiber Optic Interconnect Backplane Interface.

In addition to facilitating the use of standard components, in one embodiment, the spacer of the present invention facilitates preassembly of the backplane connector. By way of background, the aforementioned backplane connectors need to be assembled in situ on the backplane as described above. However, in accordance with the present invention the assembly can be preassembled. In one embodiment, at the factory, the shell, insert and the spacer are preassembled. This avoids risk of user error in misorienting the insert within the shell. In one embodiment, as described above, the spacer contains a press-fit cavity accepting one locating post of the shell, which holds the components together. The user simply places the unitized subassembly of the shell, insert and spacer onto the front side of the backplane aperture. As with the standard kit, the user assembles the connector mounting screws from the rear side of the backplane, threading them into the shell. Likewise, the user populates the MT cable assembly into the insert, then installs the retainer, securing it to the insert using the captive screw.

Figure 6:
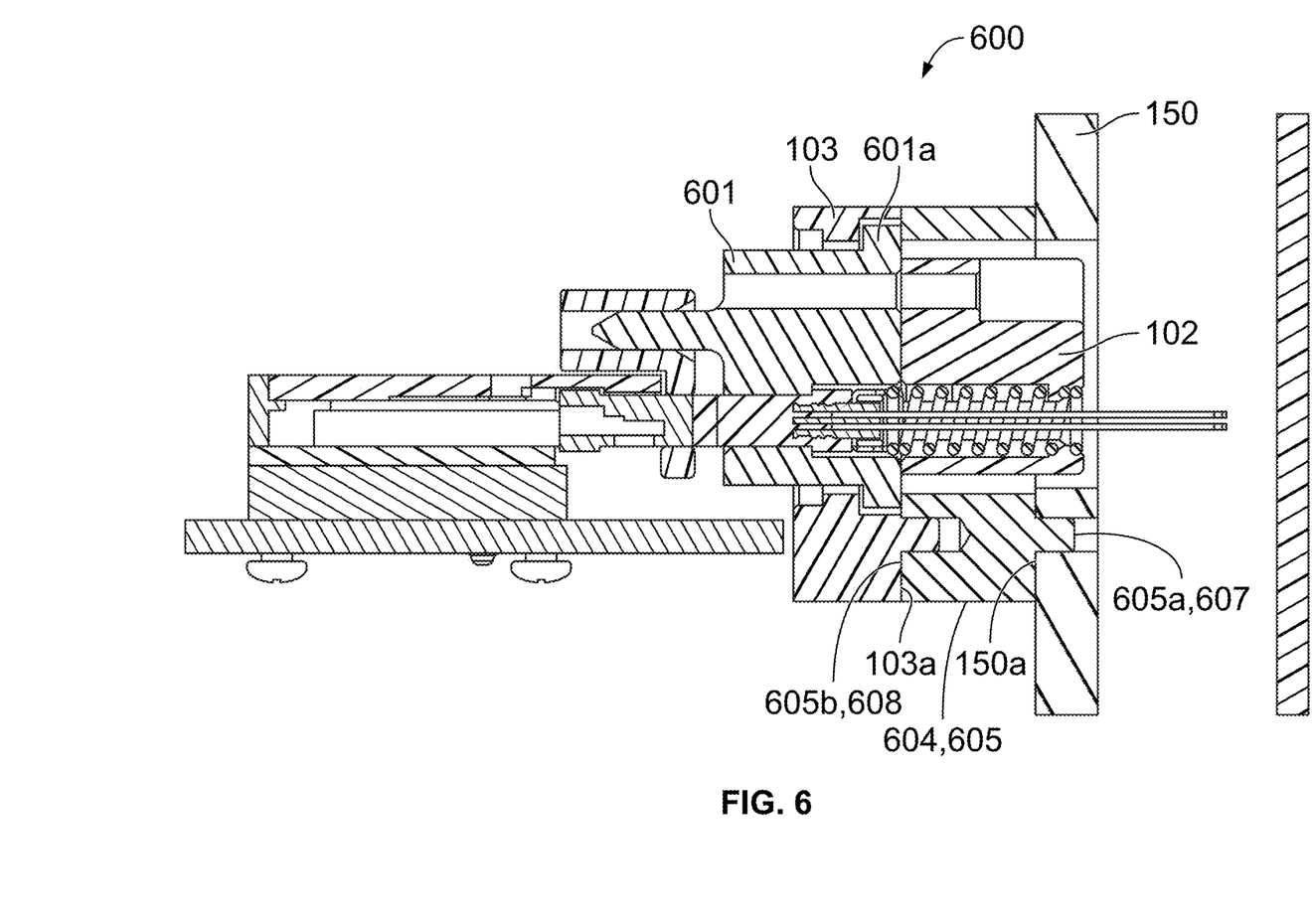
FIG. 6 shows a cross-sectional view of a different embodiment of the backplane connector of the present invention.

Referring to FIG. 6, another embodiment of a backplane connector kit 600 of the present invention is shown. This embodiment differs from the embodiment of FIGS. 1-3 in that the insert 601 is not a standard insert. More specifically, the kit 600 kit comprising: (a) an insert 601; (b) a retainer 102 defining a retainer length (RL), and being configured to receive at least one ferrule of a cable assembly and to couple with the insert, thereby securing the cable assembly to the insert; (c) an outer shell 103 having a second footprint 103a with a second geometry configured to seat with a footprint having the first geometry, and configured to receive and allow the insert to float laterally within the outer shell; and (d) a spacer 604.

The function of spacer 604 is similar to that of spacer 104. Specifically, spacer 604 comprises at least (i) a hollow body 605 having first and second end faces 605a, 605b, and defining a cavity and a length (L) between the first and second end faces; (ii) wherein the first and second end faces define third and fourth footprints 607, 608 respectively, the third and fourth footprints having second and first geometries, respectively, thus the third footprint seats with a footprint having the first geometry, and the fourth footprint seats with a footprint having the second geometry, thereby allowing fourth footprint of the spacer to seat with the first footprint of the backplane, and the third footprint of the spacer to seat with the second footprint of the insert; (iii) wherein the cavity has a width (W) sufficient to allow the insert when coupled to the retainer to move laterally within the cavity; and (iv) wherein the length L is sufficiently long such that the spacer receives at least a portion of the insert and at least a sufficient portion of the retainer such that no more than 50% of the retainer length RL extends beyond the back side of the backplane.

The insert 601 is modified slightly from the standard insert 101 shown in FIGS. 1-3. Specifically, while a standard insert has a flange positioned around its middle portion, the modified insert 601 has a flange 601a positioned around its rear portion.

Figure 7:
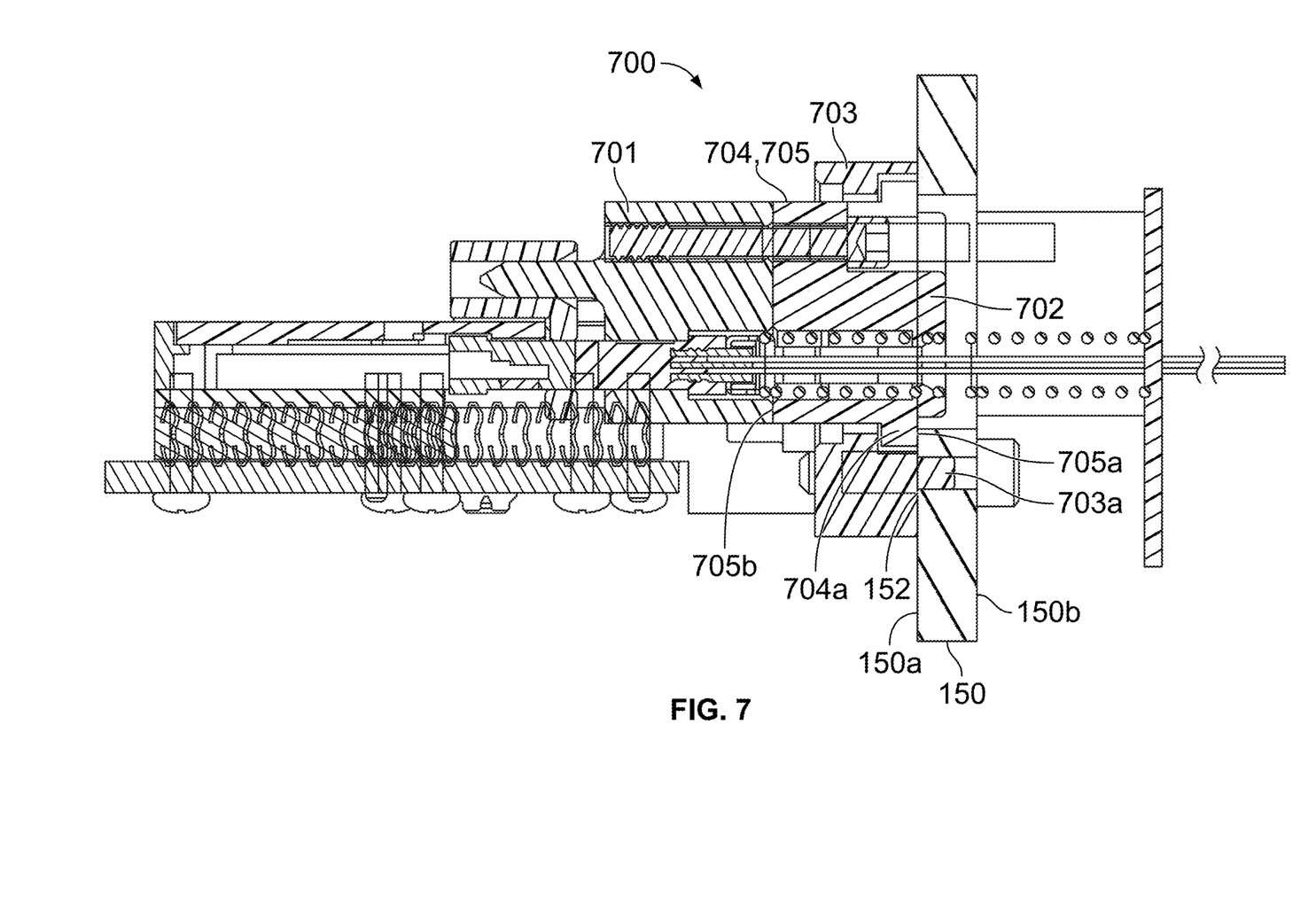
FIG. 7 shows a cross-sectional view of yet another embodiment of the backplane connector of the present invention.

Referring to FIG. 7, another embodiment of a backplane connector kit 700 of the present invention is shown. This embodiment differs from the embodiment of FIGS. 1-3 in that both the insert 701 and the retainer 702 are not standard. More specifically, the kit 700 kit comprises: (a) an insert 701; (b) a retainer 702 defining a retainer length, and being configured to receive at least one ferrule of a cable assembly and to couple with the insert, thereby securing the cable assembly to the insert; (c) an outer shell 103 having a second footprint 703a with a second geometry configured to seat with the backplane footprint 152 having the first geometry, and being configured to receive and allow the insert to float laterally within the outer shell; and (d) a spacer 704.

The spacer 704 differs from the spacers of the other embodiments in that it is integrated with the insert 701 and does not seat with the outer shell or the backplane. Rather, it is just a physical spacer to move the retainer 702 forward. In one embodiment, the spacer 704 comprises at least (i) a hollow body 705 having first and second end faces 705a, 705b, and defining a cavity and a length (L) between the first and second end faces, wherein the length L is sufficiently long such that the spacer receives at least a portion of the insert and at least a sufficient portion of the retainer such that no more than 50% of the retainer length RL extends beyond the back side of the backplane.

The insert 701 is modified from the standard insert 101 shown in FIGS. 1-3. Specifically, in one embodiment, the insert 701 is combined with the spacer 704, and a flange 704a protrudes at the rear of the spacer. In one embodiment, the insert and spacer are integrally molded.

A minimal space X between the backplane and the system enclosure is not uncommon in backplane-based systems. The approach used in this invention, adding a dedicated spacer component, may potentially be extended to similar fiber optic and RF backplane connector products and configurations. These include the VITA 66.5, Style C-Hybrid and Style D connectors, among others.

Additionally, MT ferrules having a physical-contact interface are currently used in the standard backplane connectors.

Future applications may include MT ferrules having lensed interfaces. Similar backplane connector kits, with and without spacers, may be developed to accommodate the lensed MT ferrules.

These and other advantages may be realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A backplane connector kit configured for mounting on a backplane having a front and back side, and defining an orifice, said front side defining a first footprint around said orifice, said first footprint having a first geometry, said backplane connector kit comprising:
   an insert;
   a retainer defining a retainer length, and being configured to receive at least one ferrule of a cable assembly and to couple with said insert, thereby securing said cable assembly to said insert;
   an outer shell having a second footprint with a second geometry configured to seat with a footprint having said first geometry, and being configured to receive and allow said insert to float laterally within said outer shell; and
   at least one spacer comprising at least;
      a hollow body having first and second end faces, and defining a cavity and a length between said first and second end faces;
      wherein said first and second end faces define third and fourth footprints, respectively, said third and fourth footprints having second and first geometries, respectively, thus said third footprint seats with a footprint having said first geometry, and said fourth footprint seats with a footprint having said second geometry, thereby allowing first end of said spacer to seat with said front side of said backplane, and said second end of said spacer to seat with said outer shell;
      wherein said cavity is sufficiently wide to allow said insert when coupled to said retainer to move laterally within said cavity; and
      wherein said length is sufficiently long such that said spacer receives at least a portion of said insert and at least a sufficient portion of said retainer such that no more than 50% of said retainer length extends beyond said back side of said backplane.

2. The backplane connector kit of claim 1, wherein no more than 25% of said retainer length extends below said back side of said backplane.

3. The backplane connector kit of claim 1, wherein no portion of said retainer extends below said back side of said backplane.

4. The backplane connector kit of claim 1, wherein said spacer receives said retainer in its entirety.

5. The backplane connector kit of claim 1, wherein no portion of said retainer length extends below said back side of said backplane.

6. The backplane connector kit of claim 5, wherein said retainer is above said front side of said backplane.

7. The backplane connector kit of claim 1, wherein each of said insert, said retainer, and said outer shell is a standard insert, a standard retainer, and a standard outer shell, respectively.

8. The backplane connector kit of claim 1, wherein each of said retainer and said outer shell is a standard retainer and a standard outer shell, respectively.

9. The backplane connector kit of claim 8, comprising a modified insert, said modified insert being modified from said standard insert, said standard insert having a flange positioned around its middle portion, said modified insert being shortened relative to said standard insert, and having said flange positioned around its rear portion.

10. The backplane connector kit of claim 1, wherein said retainer is a standard retainer.

11. The backplane connector kit of claim 10, comprising a modified insert and a modified outer shell, said modified insert and said modified outer shell being modified from a standard insert and a standard outer shell, respectively, wherein said standard insert has a flange positioned along the middle portion of said insert, and said standard outer shell has a certain length, wherein said modified insert being shortened relative to said standard insert, and having said flange positioned around its rear portion.

12. A spacer configured to cooperate with components of a conventional backplane connector kit, said conventional backplane connector kit configured for mounting on a backplane having a front and back side, and defining an orifice, said front side defining a first footprint around said orifice, said first footprint having a first geometry, said conventional backplane connector kit comprising at least an outer shell, an insert, and a retainer having a retainer length, said outer shell having a second footprint having a second geometry configured to seat with a footprint having a first geometry, said outer shell and said insert being configured to allow said insert to float laterally within said outer shell, said retainer configured to receive at least one ferrule of a cable assembly and to couple with said insert, thereby securing said cable assembly to said insert, said spacer comprising:
   a hollow body having a first and second end faces, and defining a cavity and a length between said first and second end faces;
   wherein said first and second end faces define third and fourth footprints respectively, said third and fourth footprints having second and first geometrys, respectively, thus said third footprint seats with a footprint having said first geometry, and said fourth footprint seats with a footprint having said second geometry, thereby allowing said first end of said spacer to seat with said front side of said backplane, and said second end of said spacer to seat with said outer shell;
   wherein said cavity is sufficiently wide to allow said insert when coupled to said retainer to move laterally within said cavity; and
   wherein said length is sufficiently long such that said spacer receives at least a portion of said insert and at least a sufficient portion of said retainer such that no more than 50% of said retainer length extends beyond said back side of said backplane.

13. The spacer of claim 12, wherein no more than 25% of said retainer length extends below said back side of said backplane.

14. The spacer of claim 12, wherein no portion of said retainer extends below said back side of said backplane.

15. The spacer of claim 12, wherein said spacer receives said retainer in its entirety.

16. The spacer of claim 12, wherein no portion of said retainer length extends below said back side of said backplane.

17. The spacer of claim 16, wherein said retainer is above said front side of said backplane.

18. The spacer of claim 12, wherein each of said insert, said retainer, and said outer shell is a standard insert, a standard retainer, and a standard outer shell, respectively.

* * * * *